United States Patent [19]

Zablocki et al.

[11] Patent Number: 5,474,791
[45] Date of Patent: Dec. 12, 1995

[54] BEVERAGES USING TAMARIND EXTRACT AND METHOD OF MAKING SUCH BEVERAGES

[75] Inventors: Linda Zablocki, Mt. Prospect; Suzanne Pecore, Deerfield, both of Ill.

[73] Assignee: The NutraSweet Company, Deerfield, Ill.

[21] Appl. No.: 139,373

[22] Filed: Oct. 20, 1993

[51] Int. Cl.$^6$ .............................. A23L 1/236; A23L 2/00
[52] U.S. Cl. .................. 426/548; 426/590; 426/598
[58] Field of Search .................................. 426/548, 590, 426/598

[56] References Cited

U.S. PATENT DOCUMENTS 5,126,158   6/1992   Sharkasi et al. ..................... 426/548

OTHER PUBLICATIONS

Furia et al., Fenarole's Handbook of Flavor Ingredients, vol. I, 2nd Ed., 1975, CRC Press: Cleveland, pp. 473–474.

Salunkhe et al, Post Harvest Biotechnology of Fruits, vol. II, 1984, CRC Press: Boca Ration, Fla., pp. 81–85.

*Primary Examiner*—Helen Pratt
*Attorney, Agent, or Firm*—Jeffrey M. Hoster

[57] ABSTRACT

Tamarind extract is used at low levels as a replacement for the phosphoric, citric or other acids conventionally found in carbonated soft drinks, flavored waters such as flavored waters, and iced teas. The resulting beverage has a higher pH, thus increasing the shelf life of beverages containing aspartame, as well as a flavor profile equivalent or better than conventional beverages sweetened with aspartame.

20 Claims, No Drawings

5,474,791

BEVERAGES USING TAMARIND EXTRACT AND METHOD OF MAKING SUCH BEVERAGES

BACKGROUND OF THE INVENTION

This invention relates to the field of beverages such as carbonated soft drinks, flavored waters, and ready-to-drink iced teas. More specifically, it relates to a method for improving the taste and long-term sweetness profile of these beverages when sweetened with aspartame.

Beverages such as carbonated soft drinks, flavored waters, including but not limited to, sparkling waters, and ready-to-drink iced teas are generally acidified with food grade acids. Carbonated soft drinks are typically acidified with phosphoric acid and citric acid, flavored waters with citric acid, tartaric acid and malic acid, and ready-to-drink iced teas with citric acid. These acids are used to control the pH of the beverages in a desired range (typically 3.05–3.10 for carbonated soft drinks, 3.1 to 3.3 for flavored waters, and 2.9–3.1 for lemon flavored iced teas). These pH levels create a taste profile which is appealing to consumers. The addition of acids in these products enhances the way that flavors are perceived. Also, acidic environments generally contribute to greater microbiological stability.

Aspartame is a high potency sweetening ingredient used in the vast majority of sugar-free soft drinks sold in the United States, as well as in growing numbers of flavored waters and iced teas. The use of aspartame would be even greater, with new markets opening worldwide, and in blends with sucrose and high fructose corn syrup ("HFCS") but for some limitations. First, many beverages, soft drinks in particular, are formulated at pH levels below 3.2. At these low pH levels, aspartame will eventually break down into its component amino acids. Although these products are harmless, they are not sweet. Also, while aspartame clearly tastes more like sugar than other high potency sweeteners currently marketed, some consumers perceive a taste difference from sucrose-sweetened beverages. It is felt by some that this limits the acceptance of beverages containing aspartame for marketing to consumers who desire the taste they recognize from sugar or HFCS sweetened beverages.

Thus, a product which allows more flexible use of aspartame while improving the taste profile of the beverage is desirable. This invention provides such an improved product.

SUMMARY OF THE INVENTION

This invention details the production of beverages in which tamarind extract is used as a replacement for a percentage of the acid conventionally found in the beverage. It has been unexpectedly discovered that beverages containing 0.001–0.05% tamarind extract as a replacement for 25–100% of the acid typically found in these beverages have sensory characteristics equivalent or better than conventional beverages. In particular, beverages sweetened with aspartame benefit from the use of tamarind, as the pH of the beverage can be controlled to a level at which aspartame is more stable. Plus, beverages including tamarind have been found to more closely match the flavor profile of sucrose-sweetened beverages.

DETAILED DESCRIPTION OF THE PREFERRED EMBODIMENT

In a preferred embodiment, a conventional beverage formulation is changed by replacing a percentage of the acids conventionally used in the formulation by tamarind extract.

Tamarind extract is derived from a fruit native to India. It is used in flavors for sauces, chutneys, and curries to add acidity and enhance fruit flavors. It has been discovered that tamarind extract has several benefits in beverages which typically use conventional combinations of acids to provide acidity and enhance the perception of flavors. In particular, sweet and sour flavors are accentuated, which is particularly beneficial in matching the taste profile commonly found in beverages. In particular, carbonated soft drinks, flavored waters, and lemon flavored iced teas benefit from the substitution of tamarind extract. For purposes of this invention, carbonated soft drinks include, but are not limited to cola, lemon-lime, orange and other fruit flavored beverages, and root beers.

The utility of the tamarind extract is particularly important in beverages sweetened with aspartame. The shelf life of aspartame in beverages is partially dependent on the pH and temperature of the beverage in which it is contained. At pHs of 3.05 to 3.10, the standard pH of cola beverages, aspartame has a typical analytically determined half-life of 165–200 days at 25° C. At pHs of 3.25–3.30, aspartame has a typical half-life of 235 days at 25° C. Conventionally, this pH cannot be changed by adjusting the level or types of acid used without altering the taste profile of these beverages. The standard pH of lemon flavored teas is 2.9 to 3.1, and flavored waters typically have a pH of 3.1 to 3.3. Some beverage products have a pH of as low as 2.5. Increases in the pH of these beverages would provide the same stability advantages. These beverages contain approximately 0.04–0.1% acid. For instance, cola beverages typically contain about 0.053% phosphoric acid. Citrus flavored beverages may contain citric acid. Flavored waters usually contain citric, tartaric or malic acid while iced teas contain citric acid.

The inventive discovery may also be useful in beverages sweetened with other high potency sweeteners, including but not limited to saccharin, cyclamates, acesulfame-K, sucralose and alitame. The flavor profile of beverages including blends of these high potency sweeteners may particularly benefit from the use of tamarind extract.

To gain the inventive benefits, from about 25 to 100% of the acid typically found in the beverage is replaced by tamarind extract. The amount of tamarind extract used and the level of acid replaced by tamarind is dependent on the specific beverage, with 0.001–0.05% being the preferred amounts of tamarind used. In a particularly preferred embodiment, 0.005–0.01% tamarind extract is used to replace 25–50% of the acid conventionally used in the beverage. More specific preferences are dependent upon the beverage. For instance, in a cola beverage containing aspartame, 0.005% tamarind extract is used in combination with 25% of the conventional phosphoric acid level. The pH of the beverage is 3.25 to 3.30 as opposed to the standard pH of 3.05–3.10, resulting in a 30 day extension of half-life. Sensory similarity testing has shown that it is possible to alter the pH of an aspartame-sweetened cola with tamarind extract to 3.30 and still be similar in taste profile to a cola with a pH of 3.10. Additionally, multiple person sensory panels have shown some improvement in the taste profile of the aspartame-sweetened cola with tamarind extract, making it more sucrose-like in taste.

While not wishing to be bound by theory, it appears that the variety of acids found in tamarind extract (citric, tartaric, malic, adipic and succinic) results in the beneficial properties described herein. The use of these acids in relatively similar proportions to that found in tamarind extract may produce similar results; however, the advantage of the exact combination of components found in tamarind, as well as a possible natural claim may make tamarind extract a more desirable choice.

The following examples detail the application of tamarind extract to beverages, and sensory results of such use in beverages. The examples are not intended to limit the scope of the invention.

EXAMPLE 1

Cola Beverages

Tamarind extracts supplied by Folexco Company were partially substituted for phosphoric acid in aspartame sweetened beverages (0.053% phosphoric acid usually used in cola beverages).

| % of Conventional Phosphoric acid | % Tamarind Extract | Beverage pH | Observations |
|---|---|---|---|
| 0 | 0.006% | 3.35–3.40 | slight loss of flavor, good mouthfeel, acid bite |
| 33.3% | 0.005% | 3.22–3.27 | good flavor with acid bite |
| 16.7% | 0.005% | 3.28–3.32 | good flavor with acid bite |
| 25% | 0 | 3.26–3.31 | flat flavor, lacked sweetness |
| 25% | 0.005% | 3.26–3.31 | good tartness and flavor |

EXAMPLE 2

Flavored Waters

Flavored water formulations were prepared using aspartame as sweetener and tamarind extract to substitute for a percentage of the citric acid conventionally used to produce a pH of about 3.24 (typically 0.10% citric acid). Various fruit flavors were added to the water. As tamarind extract contains a natural blend of acids such as tartaric, malic, and citric, it works well with fruit flavors enhanced by these acids, such as berry, grape, apple and peach.

| % of Conventional Citric Acid | % Tamarind Extract | Beverage pH | Observations |
|---|---|---|---|
| 25% | 0.005% | 4.16 | In general, slightly less tart than desired |
| 29% | 0.006% | 3.99 | Apple, raspberry, and blueberry flavors very good |
| 33% | 0.005% | 3.87 | Peach, raspberry, and grape flavors very good |

EXAMPLE 3

Cola Beverage with Sensory Results

Two aspartame sweetened (0.0525% aspartame) cola beverages where prepared using identical formulations, except for the acid levels. Sample 1 contained conventional levels of phosphoric acid, with no tamarind extract. Sample 2 contained 25% of the phosphoric acid level of Sample 1, plus 0.005% tamarind. Sample 1 had a pH of 3.05 and Sample 2 had a pH of 3.25–3.30.

Triangle Test

A triangle test for similarity of the two colas indicated that it is possible to replace 75% of the original phosphoric acid with 0.005% tamarind extract in an aspartame sweetened cola with no perceptible change in the characteristics of the cola.

Descriptive Profile Panels

Using trained descriptive profile panelists, it was shown that the tamarind cola at a pH of 3.30 was directionally lower in "diet-like" flavor and seemed to be more sucrose-like than the cola without tamarind extract at a pH of 3.05–3.10.

We claim:

1. A beverage selected from the group consisting of carbonated soft drinks, flavored waters, and iced teas comprising aspartame as a sweetening agent, wherein said beverage comprises a tamarind extract in an amount of from about 0.001–0.05% by weight of the total weight of said beverage.

2. The beverage of claim 1 wherein said beverage has a pH of from about 3.25–4.25.

3. A beverage selected from the group consisting of carbonated soft drinks, flavored waters and iced teas comprising aspartame wherein said beverages contain acids selected from the group consisting of citric acid, phosphoric acid, tartaric acid, and malic acid, said beverage comprising said acid in an amount of from 0 to about 0.05% by weight of the total weight of said beverage and tamarind extract in an amount of from about 0.001 to about 0.05% by weight of the total weight of said beverage.

4. The beverage of claim 3 wherein said beverage comprises cola beverages having 0.01–0.10% phosphoric acid by weight of the total weight of said beverage and 0.005% tamarind extract by weight of the total weight of said beverage.

5. In a method of producing a beverage selected from the group consisting of carbonated soft drinks, flavored waters, and iced teas wherein said beverage includes an acid and a sweetening agent selected from the group consisting of aspartame, saccharin, cyclamates, acesulfame-K, sucralose, and alitame, the improvement which comprises:

replacing about 25–100% by weight of the acid with a tamarind extract in an amount of from about 0.001–0.05% by weight of the total weight of said beverage.

6. The method of claim 5 wherein said beverage is selected from the group consisting of carbonated soft drinks, flavored waters and iced teas.

7. The method of claim 5 wherein about 25 to 50% by weight of the acid is replaced with a tamarind extract in an amount of from about 0.005–0.05% by weight of the total weight of said beverage.

8. The method of claim 5 wherein said beverage includes aspartame as a sweetening agent.

9. The method of claim 5 wherein said beverage includes acesulfame-K as a sweetening agent.

10. The method of claim 5 wherein said beverage includes a blend of aspartame and acesulfame-K as a sweetening agent.

11. The method of claim 5 wherein said beverage is a carbonated soft drink selected from the group consisting of colas, root beers, lemon-lime beverages, orange beverages, and other fruit flavored beverages.

12. The method of claim 5 wherein said improved beverage has a pH at least 0.1 greater than the beverage not including tamarind extract.

13. The method of claim 12 wherein said improved beverage has a half-life at least 15 days longer than the half-life of the beverage not including tamarind extract.

14. A method for producing a beverage including aspartame selected from the group consisting of carbonated soft drinks, flavored waters, and iced teas, said beverage having a pH whereby said aspartame has a half-life improvement of at least 30 days at ambient temperatures, comprising the steps of:

producing said beverage including an acid; and adding to said beverage 0.001–0.05% of tamarind extract by weight of the total weight of said beverage as a replacement for about 25–100% by weight of the acid typically found in said beverage.

15. The method of claim 14 wherein 0.005–0.01% of tamarind extract by weight of the total weight of said beverage replaces about 25–50% by weight of the acid typically found in said beverage.

16. In a method of producing an aspartame sweetened cola beverage, the improvement which comprises:

replacing 66.6 to 83.3% by weight of the phosphoric acid conventionally found in said cola beverage with a tamarind extract in an amount of 0.005–0.006% by weight of the total weight of said cola beverage.

17. In a method of producing an aspartame sweetened flavored water beverage, the improvement which comprises:

replacing 67 to 75% by weight of the acid conventionally found in said flavored water beverage with a tamarind extract in an amount of 0.005–0.006% by weight of the total weight of said flavored water beverage.

18. The method of claim 17 wherein said aspartame sweetened flavored water beverage consists of berry, grape, apple and peach flavored beverages.

19. The method of claim 17 wherein said aspartame sweetened flavored water beverage comprises sparkling water beverages.

20. A method for producing a sucrose-like taste in beverages containing aspartame as a sweetening agent, comprising the step of:

adding to said beverage a tamarind extract in an amount of 0.001–0.05% by weight of the weight of said beverage.

* * * * *